March 7, 1950   A. R. MURAT   2,499,669
TIRE DEFLATION INDICATOR
Filed Feb. 17, 1947   4 Sheets-Sheet 1
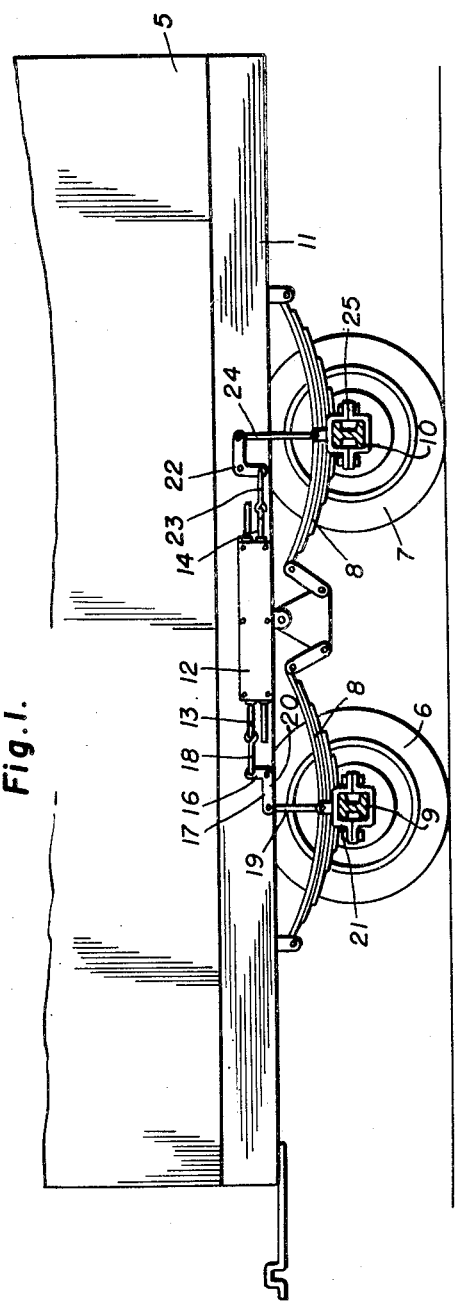
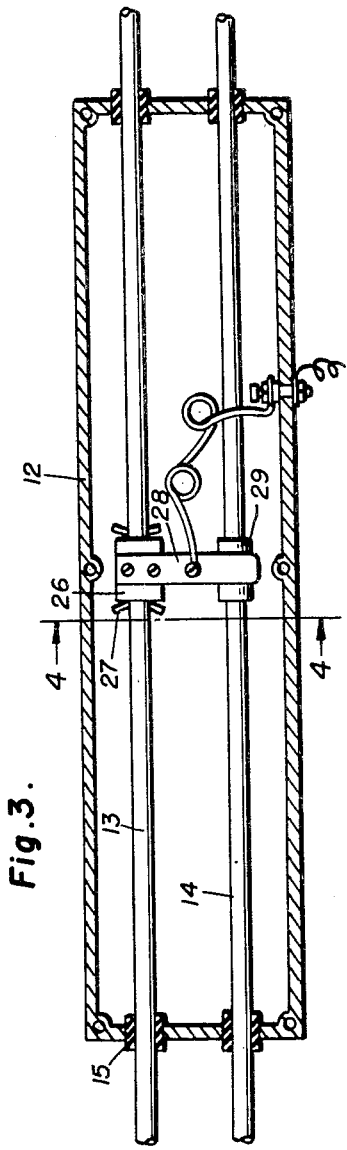
Inventor
Adolf R. Murat
By Clarence A. O'Brien
and Harvey B. Jacobson
Attorneys

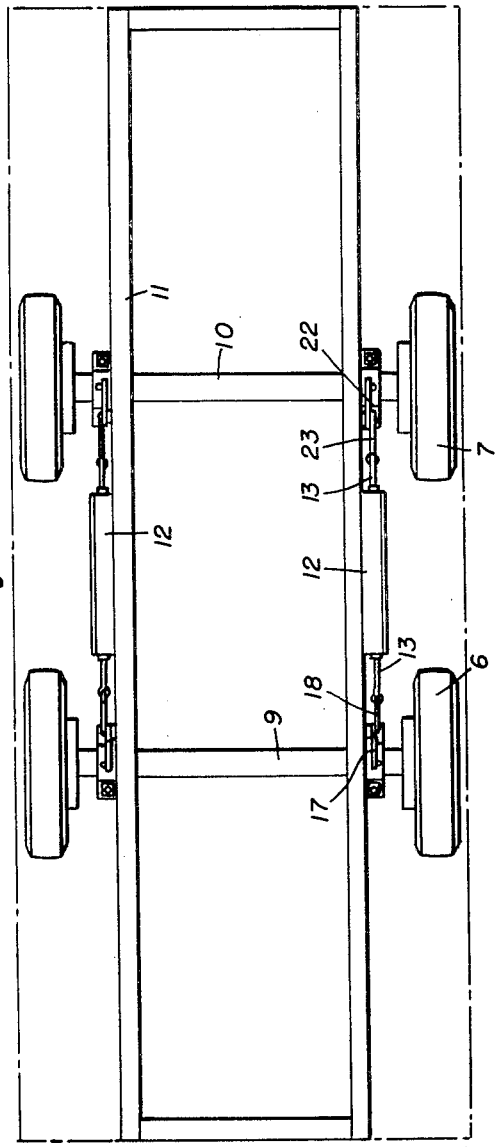
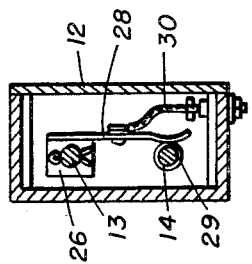
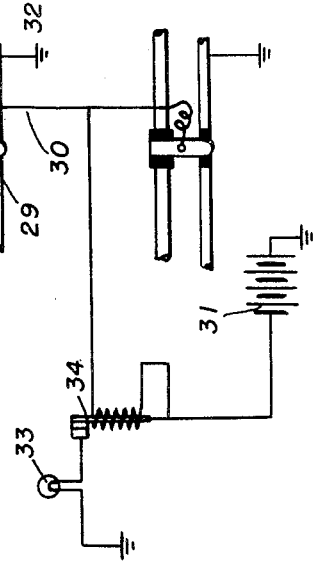

March 7, 1950 A. R. MURAT 2,499,669
TIRE DEFLATION INDICATOR
Filed Feb. 17, 1947 4 Sheets-Sheet 3
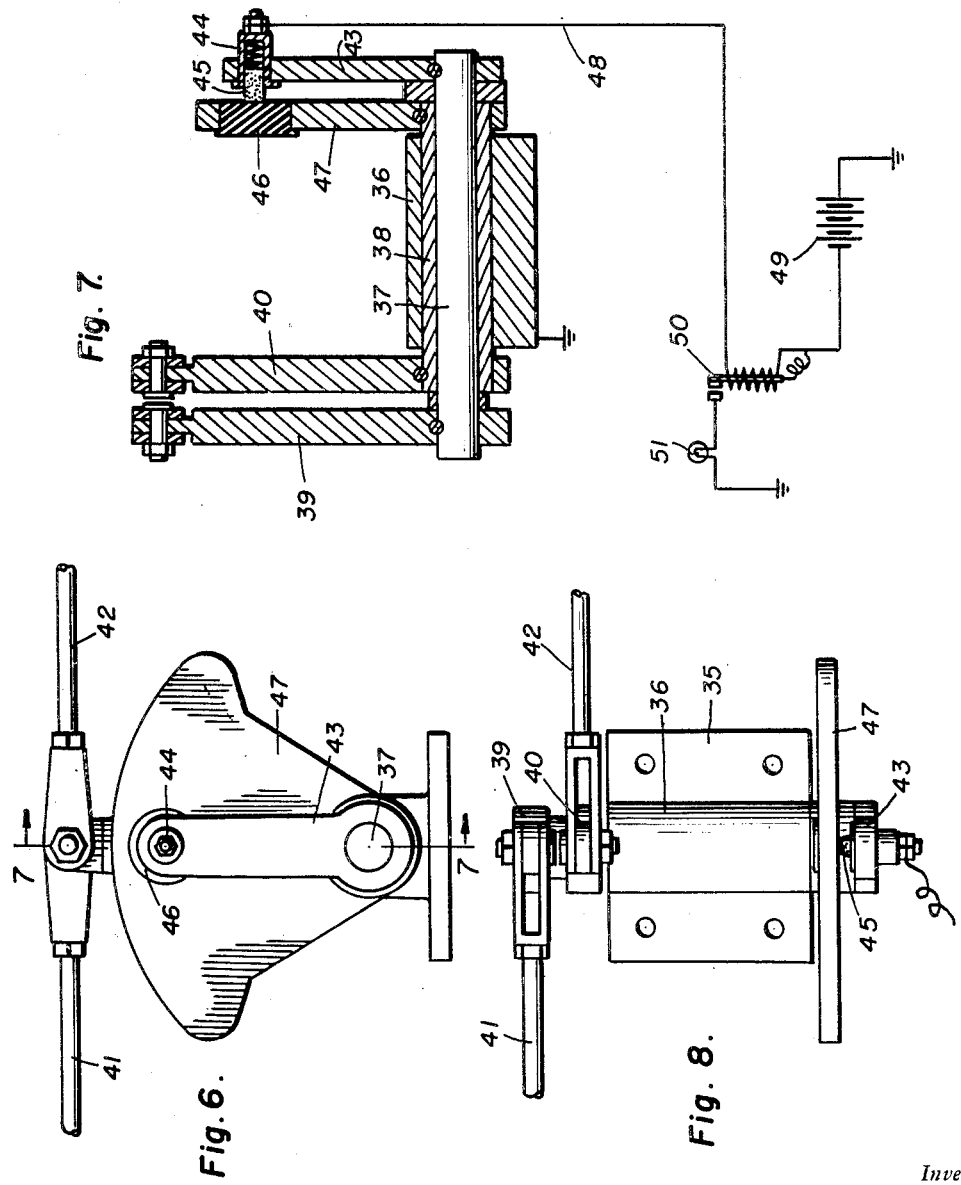
Inventor
Adolf R. Murat

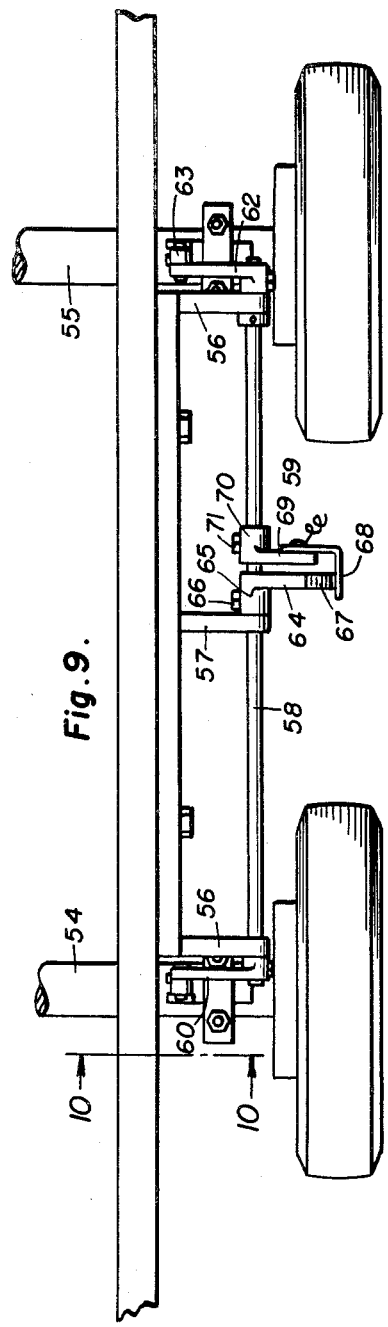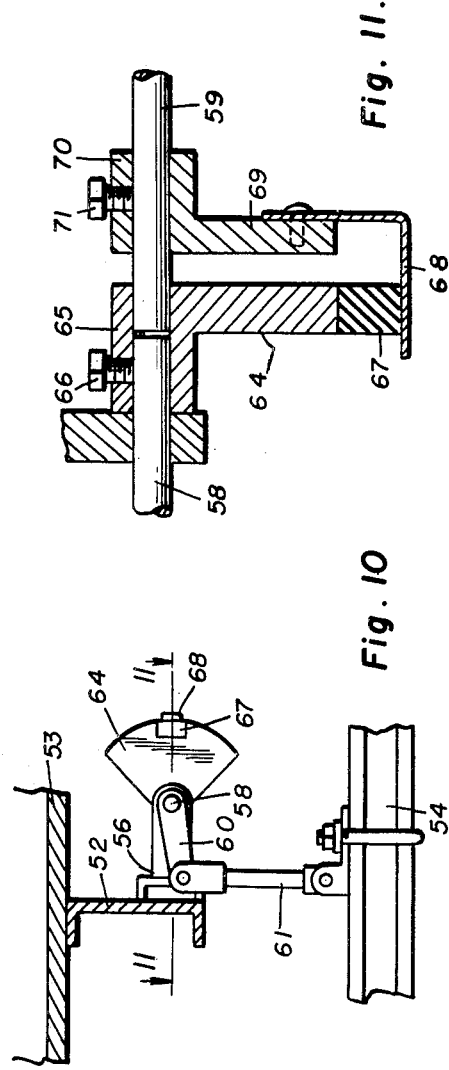

Patented Mar. 7, 1950

2,499,669

UNITED STATES PATENT OFFICE 2,499,669

TIRE DEFLATION INDICATOR

Adolf R. Murat, Laguna Beach, Calif.

Application February 17, 1947, Serial No. 729,048

3 Claims. (Cl. 200—58)

The present invention relates to new and useful improvements in indicators for pneumatic tires to provide simple, practical and effective means for indicating to the driver of a motor vehicle of an under-inflating condition of one of the tires, whereby to avoid damage to the tire while running on its under-inflated condition.

An important object of the present invention is to provide an indicating device of this character designed primarily for use upon trailers where it is difficult for the driver to notice an under-inflated condition of the tires of the trailer.

A further object of the invention is to provide an indicating means for each tire of the trailer arranged to energize an electric signal mounted adjacent the driver of the vehicle.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a trailer with parts shown in section and showing the indicating mechanism attached to the front and rear axles thereof;

Figure 2 is a top plan view;

Figure 3 is an enlarged longitudinal sectional view of the case or the sliding circuit closing rod;

Figure 4 is a transverse sectional view taken on a line 4—4 of Figure 3;

Figure 5 is a circuit diagram for the indicator mounted on opposite sides of the trailer;

Figure 6 is a side elevational view of a modified form of the circuit closing member and embodying rockable contact carrying plates;

Figure 7 is a vertical sectional view taken on a line 7—7 of Figure 6 and including a diagram of the electric circuit;

Figure 8 is a top plan view;

Figure 9 is a top plan view of a further modified form of the invention shown mounted at one side of a trailer;

Figure 10 is a sectional view taken on a line 10—10 of Figure 9; and,

Figure 11 is an enlarged sectional view taken on a line 11—11 of Figure 10.

Referring now to the drawings in detail and first with respect to the form of invention illustrated in Figures 1 to 5 inclusive, the numeral 5 designates a conventional form of trailer having front and rear pneumatic tires 6 and 7 mounted thereon, the trailer including spring suspension means 8 of conventional construction for the front and rear axles 9 and 10, the axles and wheels being in a position substantially close to each other so that when one of the tires becomes deflated the end of the axle on which the said deflated tire and wheel is mounted will be permitted, by sagging of the adjacent spring, to drop relative to the frame 11 of the trailer.

For example, if the tire of the left rear wheel 7 becomes deflated, the corresponding left end of the rear axle 10 will drop to an extent determined by the degree of pressure left in said tire, or if none is left until the tire rim limits the degree of drop. The frame 11 will tend to tilt with the left rear corner tilting downwardly and the right front corner tilting upwardly and about an axis diagonal to the frame 11 on a line, generally speaking, intersecting the vertical axes of the left front wheel 6 and the right rear wheel 7. However, the left front, right front, and rear right springs will oppose such tilting of the frame 11 to an extent such that said frame will not tilt downwardly over the dropped end of the rear axle 7 in the same degree as that to which said end has dropped. Therefore, the left end of the rear axle 7 will drop relative to the frame 11.

The invention includes a substantially rectangular casing 12 suitably secured to the frame 11 at each side of the trailer between the front and rear wheels thereof and in the ends of which are slidably mounted upper and lower longitudinally extending rods 13 and 14. Insulation bushings 15 are provided for the rods at each end of the casing 12.

The front end of the upper rod 13 is connected to the upper end of the vertical arm 16 of a bell crank lever 17 pivoted to the side of the frame 11, a connecting link 18 being provided between the bell crank lever and the front end of the rod 13.

A rod 19 extends downwardly from the end of the horizontal arm 20 of the bell crank lever and is pivoted at its lower end to a clamp 21 secured to the front axle 9.

The rear end of the lower rod 14 is similarly connected to the rear axle 10 by means of a bell crank lever 22, connecting links 23 and rod 24 extending downwardly from the bell crank lever and having its lower end pivotally attached to a clamp 25 secured to the axle 10.

The rear bell crank lever 22 is mounted in an inverted position with respect to the front bell crank lever 17 whereby to cause an opposite sliding movement of the rods 13 and 14 upon the deflation of a front or rear tire.

An insulation block 26 is mounted in a stationary position on the upper rod 13 in the casing 12 by means of pins 27 extending transversely of the rod at the ends of the block. A flat resilient contact finger 28 is secured at its upper end to the block 26 and extends downwardly therefrom and is normally held out of contact with the lower rod 14 by means of an insulation block 29 secured in a stationary position on the rod 14.

The indicating mechanism above described is mounted at each side of the frame 11 of the trailer and is identical and a circuit wire 30 leading from a suitable source 31 is attached to each of the contact fingers 28 and the lower rod 14 of each indicating mechanism is grounded as shown at 32. A signalling element, such as a lamp, buzzer or the like and indicated at 33 is connected in the circuit 30 with a conventional relay 34, the relay being provided in order to prevent the signalling element 33 from becoming energized when the trailer is traveling over rough roads whereby the flow of current to the signalling element is delayed.

In the operation of the device, should one of the tires, such as the front tire 6 become deflated, the wheel and the end of the axle to which the tire is mounted will drop thereby causing a forward sliding movement of the upper rod 13 by reason of its connection with the axle by the bell crank lever 17 and will move the contact finger 28 forwardly out of its engagement with the insulation block 29 and into contact with the lower rod 14 to close the circuit with the signalling element.

It will also be apparent that as the front axle 9 moves downwardly upon the deflation of a front wheel 6 to slide the upper rod 13 forwardly, and at the same time the rear axle 10 moves upwardly in relation to the frame 11 due to the extra load subjected to the rear spring, this upward movement of the rear axle sliding the lower rod 14 rearwardly to thus cause a quick and effective closing of the circuit by such opposite movement of the rods 13 and 14 by a relatively slight upward or downward movement of the axle, thereby closing the circuit for the signalling element by a partial deflation of one of the tires.

In Figures 6 to 8 inclusive, I have illustrated a modified construction of the circuit closing mechanism and which includes an attaching plate 35 secured to a suitable part of a trailer frame between the front and rear wheels, the attaching plate being formed on its upper surface with a bearing sleeve 36 in which co-axial inner and outer shafts 37 and 38 are rotatably mounted. The shaft 37 may be of solid construction that is rotatably mounted in the hollow shaft 38.

The shaft 37 and 38 extend transversely with respect to the trailer and to one end of the shaft 37 is secured an upwardly extending arm 39 while to the adjacent end of the shaft 38 is secured a similar upstanding arm 40. A rod 41 is pivotally attached to the upper end of arm 39 and extends forwardly for attaching to the front end of the axle of the trailer in the same manner as the rod 13 is attached to the axle in Figure 1 and a rod 42 is likewise attached to the upper end of arm 40 for similarly connecting to the rear axle of the trailer.

To the other end of shaft 37 is secured an upstanding plate 43 of suitable insulation material and having a socket 44 of conductive material positioned therein adjacent its upper end. A spring projected contact brush 45 is slidably mounted in the slot 44 and projects inwardly of the plate 43 normally against an insulation plug 46 mounted in the upper portion of a plate 47 secured to the adjacent end of shaft 38, the plate 47 being preferably constructed in the form of a segment of a disc.

The socket 44 is connected in an electric circuit 48 with a suitable source of current 49 as heretofore described, the circuit also including the relay 50 and signalling element 51.

In the operation of this form of the invention the circuit is normally maintained in an open position by the engagement of the brush 45 with the insulation plug 46 when the tires of the trailer are inflated. Should one of the tires become deflated the rods 41 and 42 are pulled in opposite direction in the same manner as explained with respect to the form of the invention illustrated in Figure 1, whereupon the shafts 37 and 38 will be oppositely rotated and swing the plates 43 and 47 in opposite directions whereby to place the brush 45 in contact with the plate 47 and thus close circuit.

A further modified form of this invention is illustrated in Figures 9 to 11 inclusive and comprises a channel member 52 secured to the frame 53 of the trailer between the front and rear axles 54 and 55, the channel member having bearing brackets 56 projecting horizontally at the ends thereof and a bearing bracket 57 projecting horizontally from the center thereof. Front and rear longitudinally aligned shafts 58 and 59 are journaled in the bearing brackets, the front end of the front shaft 58 being connected to the front axle 54 by means of a crank arm 60 and rods 61 connecting the axle to the outer end of the arm as shown in Figure 10. The rear end of the rear shaft 59 is similarly connected to the rear axle 55 by means of a crank arm 62 and rod 63 whereby to rotate the respective shafts by vertical movement of the axles.

A straight metal plate 64 is formed at its inner edge with a hub 65 in which the rear end of the front shaft 58 is secured by a set screw 66. The front end of the rear shaft 59 is freely journaled in said hub as shown in Figure 11 of the drawings.

The outer arcuate edge of plate 64 is provided with an insert 67 of insulation material and a resilient L-shaped contact finger 68 is arranged to travel over the arcuate edge of plate 64 by means of a similar plate 69 to which the contact finger 68 is secured and insulated therefrom the inner edge of plate 69 also being formed with a hub 70 secured to the front end of said shaft 59 by a set screw 71.

In the operation of this form of the invention, the circuit (not shown) connected to the contact finger 68 is normally open when the tires of the trailer are in inflated position by reason of engagement of the contact finger with the insulation insert 67 of the plate 64. Upon a vertical movement of either the axles 54 or 55 by a deflation of one of the tires the shafts 58 and 59 will be rotated in opposite directions thus swinging the plate 64 downwardly or upwardly, as the case may be, and swinging the plate 69 in an opposite direction to thus move the contact finger 68 away from the insert 67 and close the circuit with the arcuate edge of plate 64.

By the operation of either form of this invention in the manner as indicated it will be apparent that the signalling element will be energized to warn the driver that one of the tires has become partially or fully deflated.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. In a tire deflation indicator for a vehicle having a chassis with a frame, front and rear axles vertically movable relative to the frame, and wheels with pneumatic tires on said axles, a pair of normally separated electrical contacts carried by said frame and rockable relatively into engagement for closing an indicator circuit, and crank and pitman means connecting the contacts, respectively, to the front and rear axles and arranged to rock one contact into engagement with the other upon vertical movement of either axle relative to the frame resulting from deflation of the tire of a wheel on the axle.

2. In a tire deflation indicator for a vehicle having a chassis with a frame, front and rear axles vertically movable relative to the frame, and wheels with pneumatic tires on said axles, a pair of coaxial rock shafts journaled on said frame, radially extending electrical contact arms on contiguous ends of said shafts arranged for wiping engagement to close an indicator circuit upon rocking of said shafts relatively, and means connecting said shafts, respectively, to the front and rear axles for rocking of one shaft relative to the other upon vertical movement of either axle relative to the frame resulting from deflation of the tire of a wheel on the axle.

3. In a tire deflation indicator for a vehicle having a chassis with a frame, front and rear axles vertically movable relative to the frame, and wheels with pneumatic tires on said axles, a pair of coaxial rock shafts journaled on said frame, radially extending electrical contact arms carried by said shafts and arranged for wiping engagement to close an indicator circuit upon rocking of said shafts relatively, an insulation member separating said arms until said shafts are rocked relatively, and means connecting said shafts, respectively, to the front and rear axles for rocking of one shaft relative to the other upon vertical movement of either axle relative to the frame resulting from deflation of the tire of a wheel on the axle.

ADOLF R. MURAT.

REFERENCES CITED

The following references are of record in the file of this patent:

UNITED STATES PATENTS

| Number | Name | Date |
|---|---|---|
| 1,565,687 | Tomlinson | Dec. 15, 1925 |
| 1,917,962 | Forrest | July 11, 1933 |
| 2,107,912 | Spieth | Feb. 8, 1938 |

FOREIGN PATENTS

| Number | Country | Date |
|---|---|---|
| 380,901 | Great Britain | Sept. 29, 1932 |